United States Patent

[11] 3,590,438

| [72] | Inventors | Gerald R. Ritter<br>South Bend;<br>Gilbert C. Zion, Mishawaka, both of, Ind. |
|---|---|---|
| [21] | Appl. No. | 808,278 |
| [22] | Filed | Mar. 18, 1969 |
| [45] | Patented | July 6, 1971 |
| [73] | Assignee | Uniroyal, Inc.<br>New York, N.Y. |

[54] INLET AND NOZZLE APPARATUS FOR A MOLD
2 Claims, 4 Drawing Figs.

[52] U.S. Cl. .................................................. 18/30,
264/50, 264/331, 141/311, 18/5 P
[51] Int. Cl. .................................................. B29b 5/04
[50] Field of Search ........................................... 18/5 P, 5
BF, 5 BE, 30; 239/600, 288.3, 288.5; 264/45, 330,
331; 249/105, 141

[56] References Cited
UNITED STATES PATENTS

| 2,537,684 | 1/1951 | Manuel ........................ | 25/121 |
| 2,541,592 | 2/1951 | Lietaert........................ | 18/42 |

*Primary Examiner*—J. Spencer Overholser
*Assistant Examiner*—Norman E. Lehrer
*Attorney*—Charles A. Blank ABSTRACT: Low density foam objects are made from a material so highly frothed that it is difficult to pour into a mold. It is therefore delivered to the mold under pressure by means of system having a holding tank with appropriate foam inlet and outlet means, a mechanism for maintaining constant pressure in the tank, a mechanism for preventing overfilling of the tank, and a control which allows air to enter the tank to replace the foam material displaced during filing of the mold. The foam delivery hose has a special nozzle which rapidly couples to and decouples from the mold filling port. The mold has special provision for preventing leakage of foam between the mold cavity and its top plate.

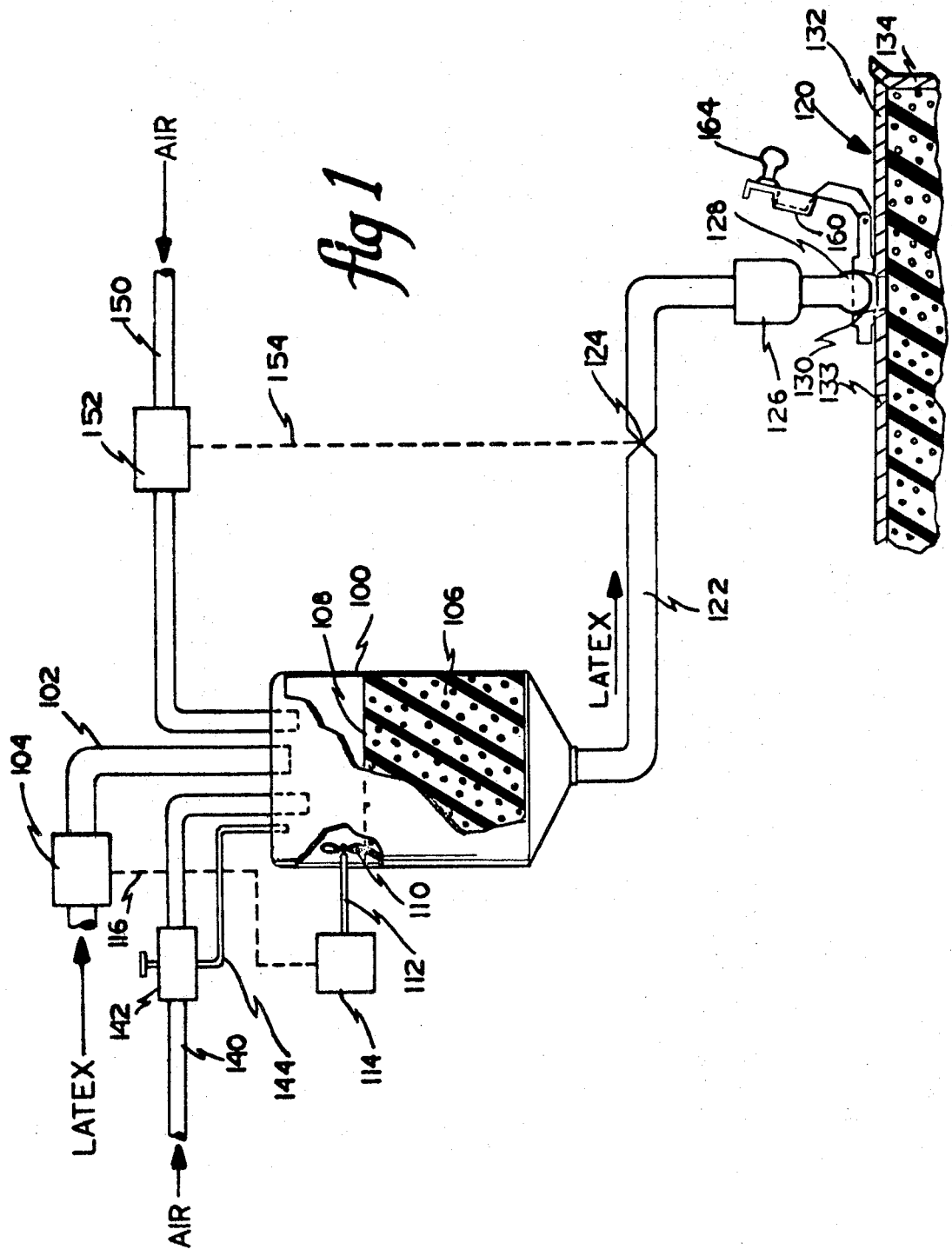

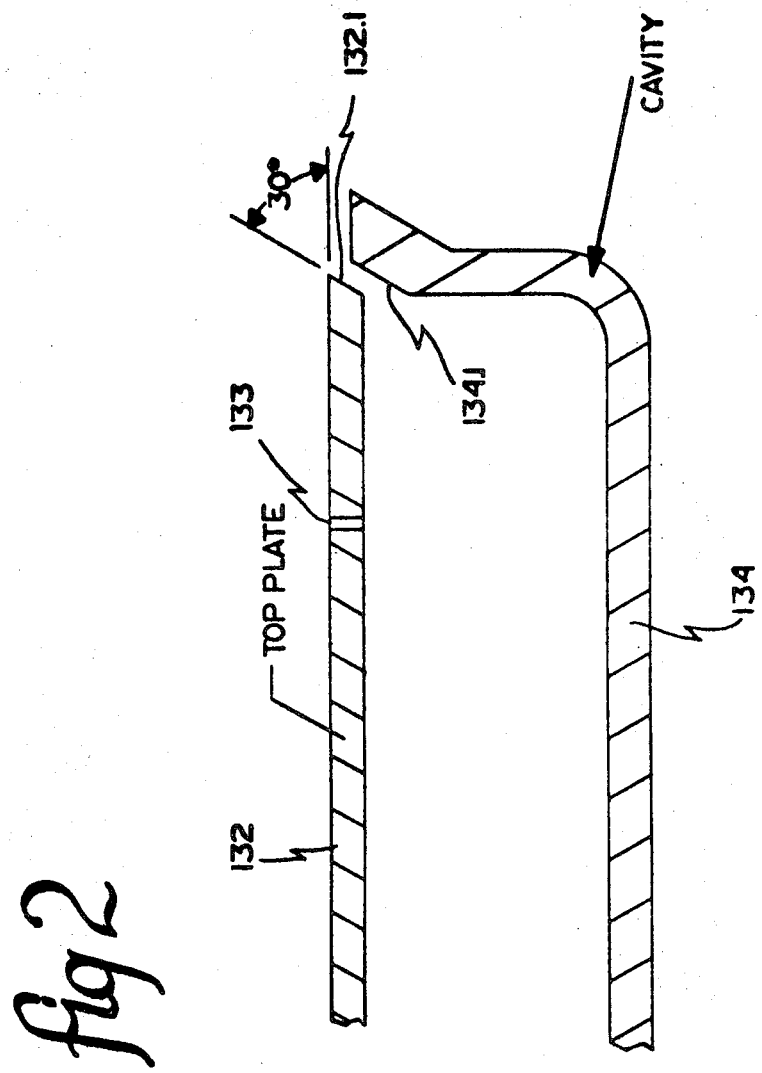

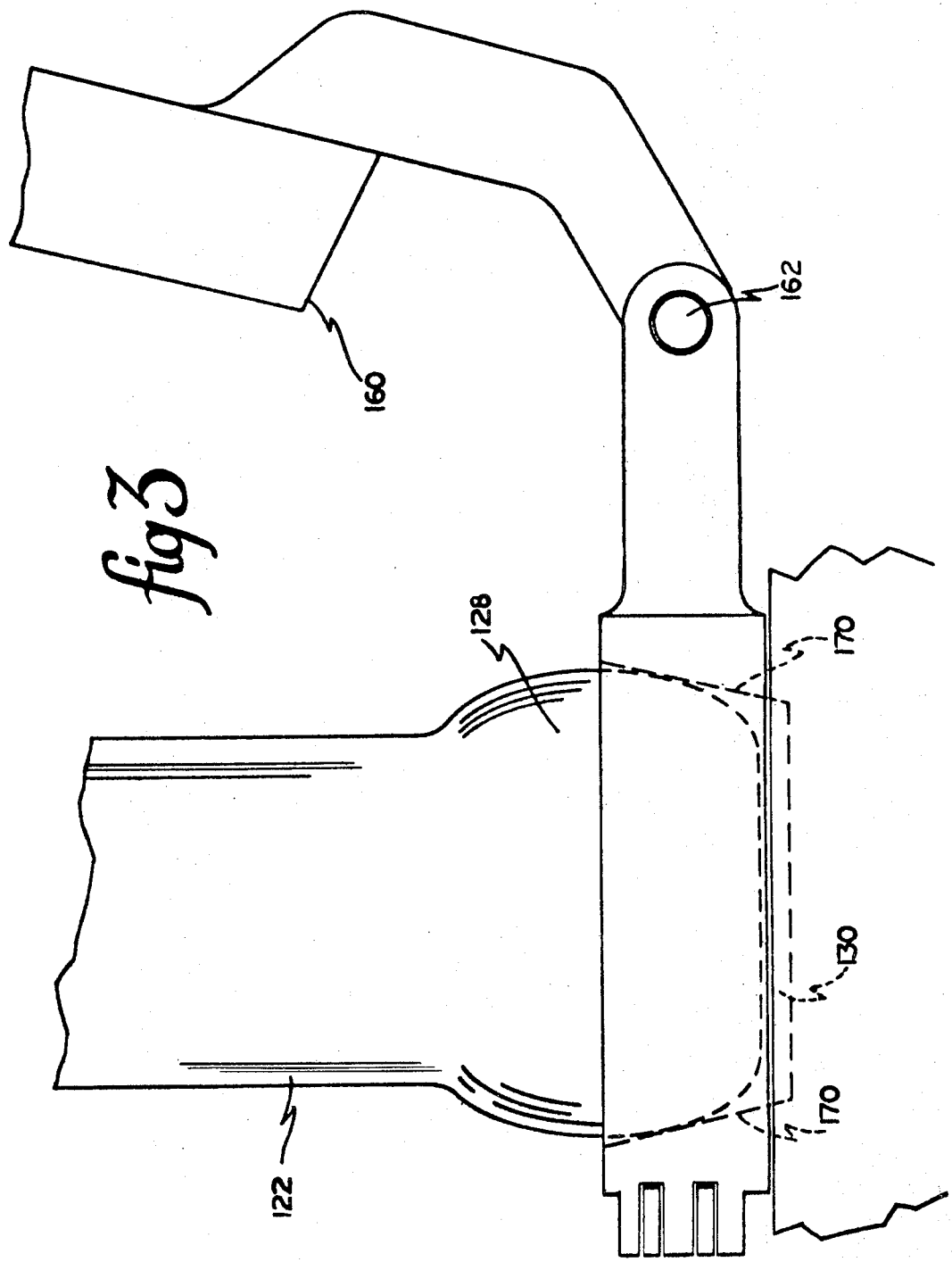

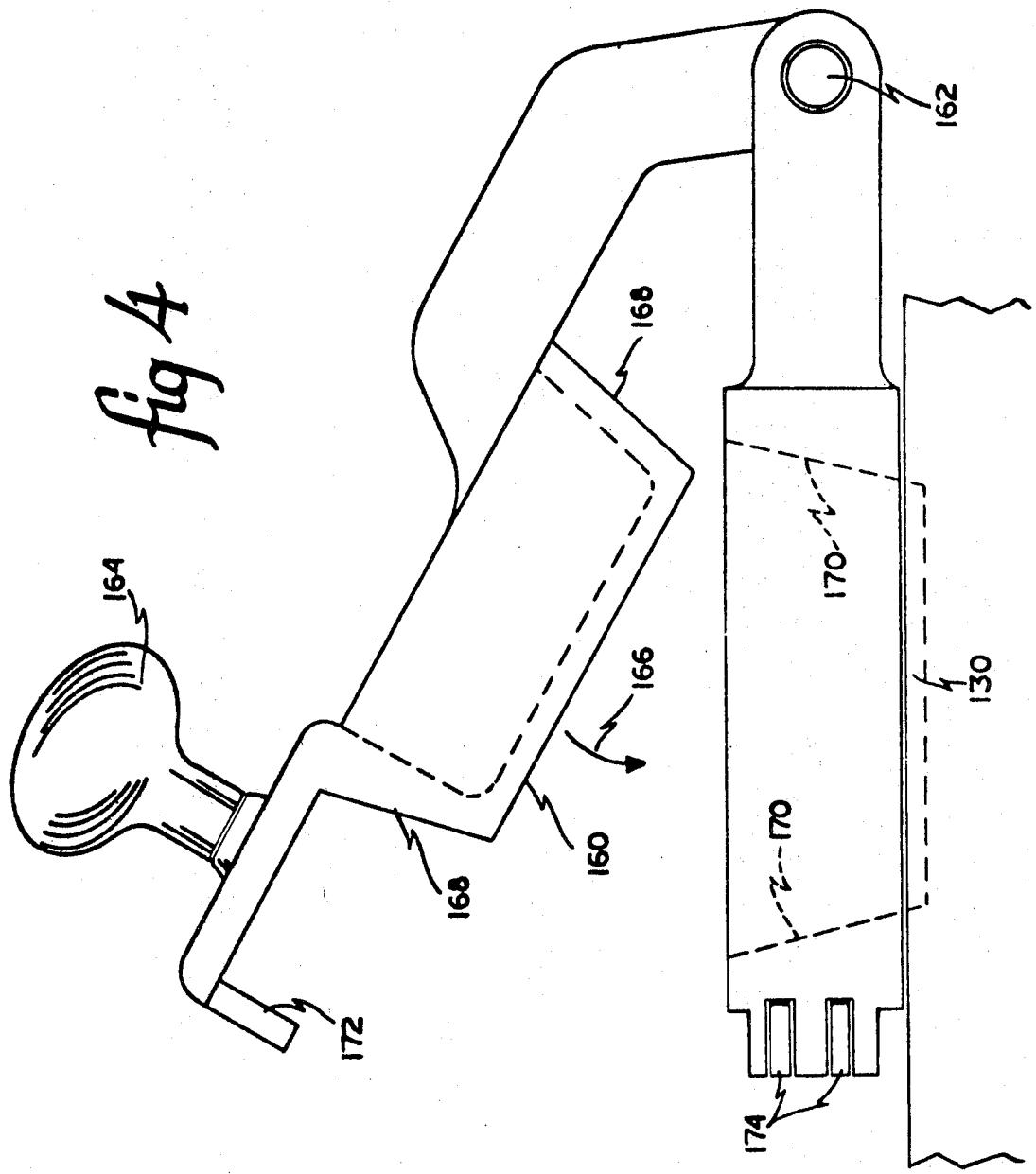

INLET AND NOZZLE APPARATUS FOR A MOLD

THE PRIOR ART

In conventional molding of foam objects from materials such as latex, polyurethane and the like, the material is generally poured into the mold either before or after being foamed. Even materials which are first whipped to a frothy consistency before reaching the mold usually do not become stiff enough to prevent their being poured.

But in the manufacture of foam objects of exceptionally low density, the froth has such a high volume of air interspersed with the solid and liquid constituents that, like a firm meringue, it is too stiff to permit pouring. In such instances it is necessary to resort to pressure filling of the mold instead of the usual pouring approach.

SUMMARY AND OBJECTS OF THE INVENTION

This invention provides superior apparatus for the pressure filling of molds in the manufacture of low density foam objects.

In order to maintain a constant flow of foam material to the mold regardless of the level in the supply vessel, a tank holds a reservoir of foam material at a regulated pressure for delivery to the mold. The foam material is transferred from the tank to the mold by means of a delivery line having a nozzle which connects rapidly to the mold, and also disconnects rapidly therefrom. A special cover is provided for sealing the fill port of the valve after withdrawal of the nozzle. A check valve is also included in the line to sense back pressure and terminate delivery of foam material when the mold is full.

The mold is designed to make an effective pressure seal around its top plate, and to prevent any flashing of the foam material when the mold is filled under pressure.

Safety systems are provided to regulate the contents of the holding tank, including a mechanism which detects and prevents overfilling.

BRIEF DESCRIPTION OF THE DRAWINGS

FIG. 1 is a schematic diagram of a system in accordance with this invention for the pressure filling of molds with highly frothed foam material.

FIG. 2 is an enlarged fragmentary vertical section of a mold in accordance with this invention, which is seen also in the system of FIG. 1.

FIG. 3 is an enlarged, fragmentary side elevational view showing details of the filling nozzle, the filling port, and the filling port cover of the apparatus of FIGS. 1 and 2. view of the fill port and its cover after the nozzle has been removed and the cover is in the process of being closed to prevent the escape of foam from the mold.

The same reference characters refer to the same elements throughout the several views of the drawings.

DETAILED DESCRIPTION OF THE PREFERRED EMBODIMENT

FIG. 1 shows an overall view of the pressure filling system. A conventional material such as latex is prepared and frothed in any known manner, and delivered to a holding tank 100 by means of a pipe 102 which is controlled by a solenoid-operated valve 104. Latex material 106 within the tank is shown at a typical operating level 108. In order to regulate the latex level and prevent overfilling of the holding tank 100, a rotatable paddle wheel 110 is positioned inside the tank and affixed to the end of a shaft 112 which emerges from the tank to actuate a switch 114 connected to control the solenoid of the latex supply control valve 104, as indicated by dashed line 116. The assembly of the paddle wheel 110, its shaft 112 and the switch 114 represents a conventional mechanism which detects when the level of the latex material 106 in the tank 100 rises high enough to contact the paddle wheel 110. Under these conditions, the switch 114 is actuated to close the valve 104, thus shutting off the flow latex into the tank 100 and preventing overfilling. The paddle wheel assembly may be either of two commercially available types: one in which the wheel 110 normally rotates except when restrained by contact with the latex froth 106; or the other type in which the wheel is normally stationary except when deflected by the froth material. Preferably in lieu of the paddle wheel assembly, a conductive probe may be utilized to detect when the level of the latex material has risen sufficiently. The probe conducts current through the moisture of the latex material to actuate switch 114 to close valve 104 when the level of the latex material has risen sufficiently to contact the probe. The position of the probe may be adjustable to allow adjustment of the level of the latex material at which the probe contacts the latex material.

In order to fill a mold 120 comprising a top plate 132 and cavity vessel 134 with the froth material 106 which is too stiff for open pouring, pressure is built up in the tank 100 to force the material through a delivery hose 122 controlled by a filling valve schematically depicted at 124. The delivery nose has in it a diaphragm type compression valve 126, also schematically depicted, which terminates the delivery of foam material to the mold 120 when back pressure therein indicates that the mold has been filled. A nozzle 128 at the end of the delivery hose mates with a filling port 130 on the top plate 132 to facilitate a rapid filling connection and rapid disconnect after filling is completed.

The pressure inside the holding tank 100 is held at a constant level so as to maintain a steady rate of flow of foam material into the mold 120. This is accomplished by a line 140 which brings air under pressure into the upper region of the holding tank 100, above the level of the foam material 106. A pressure responsive valve 142 controls the flow of pressurized air into the tank 100 in response to the pressure inside the tank, as sensed through a tube 144. The valve 142 admits as much pressurized air into the tank 100 as necessary to maintain a predetermined pressure level therein.

Another pressurized air inlet is provided by a line 150 which brings in a larger volume of air under control of a solenoid-operated valve 152. The air input provided by the first-mentioned line 140 delivers a relatively small volume of air for pressure regulating purposes, while the line 150 delivers larger volumes of air to replace the quantity of foam material 106 delivered during filling of the mold 120. In order to accomplish this, the fill valve 124 is connected, as schematically illustrated by dashed line 154, to open the valve 152 and thus allow an inrush of pressurized air to the tank 100 during the time that the fill valve 124 is operated.

During filling, the air in the mold 120 is allowed to escape through a small vent hole 133 so as to prevent the formation of voids in the molded product by trapped air. However the vent hold is small enough to prevent the escape of any substantial amount of foam material therefrom. When the air in the mold has all been displaced and the foam material surges against the opening 133, that opening provides enough of a restriction to cause the foam to exert back pressure on valve 126 and shut off the delivery of foam before the material can transit the vent hole.

In order to provide superior sealing between the vessel 134 and the top plate 132 which form the mold 120, these members are formed with angle surfaces 132.1 and 134.1 respectively as seen in the sectional view of FIG. 2. Specifically, the cavity vessel 134 is provided with an internal conical surface 134.1 around the edges of the top opening thereof, while the top plate 132, which fits into that opening, is provided with an external conical surface 132.1 around its edges. The conical surfaces are machined and individually matched so that they are essentially congruent with each other. This has been found to provide superior sealing and self-trimming performance in actual service, nearly eliminating flashing of the foam material between the top plate 132 and cavity vessel 134. The preferred angle for the surfaces 132.1 and 134.1 is 30° relative to the horizontal.

The purpose of the rapid disconnecting cooperation between the nozzle 128 and the filler port 130 is to prevent a significant amount of the pressurized foam from backing up through the filler port 130 after the nozzle 128 has been removed. For the same reason, a cover 160 is attached to the top plate 132 by means of a hinge mechanism 162 so that, as soon as withdrawal of the nozzle 128 is effected, the cover 160 can be rotated rapidly toward the filler port 130 as depicted in FIG. 4.

As best seen in FIG. 3, the filler port 130 is bounded by a machined internal conical surface 170 which mates with the nozzle 128 during the filling operation. The latter has a bulbous, generally spherical shape which advantageously limits it to a shallow insertion into the fill port 130, and which makes a 360° circular sealing contact against the internal conical surface 170 during the filling operation. It is apparent that this nozzle 128 can be rapidly inserted into the filler port 130 and seated against the surface 170 to initiate the filling operation, and subsequently can be rapidly disengaged and removed by simple vertical withdrawal at the conclusion of the filling operation.

As soon as the nozzle 128 has been withdrawn, the cover 160 is grasped by a knob 164 and manually rotated about its hinge mechanism 162 to swing downwardly into covering relationship with the fill port 130, as indicated by the arrow 166 in FIG. 4. The hinged cover 160 is provided with an external conical surface 168 machined to match the internal surface 170 when the cover is in place. This prevents subsequent escape of the pressurized foam material which might otherwise back up through the fill port 130. The cover 160 is latched in place after closure by means of a steel plate 172 depending from the extremity thereof, which cooperates with a pair of permanent magnets 174 to form a magnetic latch.

The operation of the entire system would normally proceed in the following sequence. After the holding tank 100 has been filled with foam material 106 to the level 108, and the pressure regulating air inlet 142 has brought the internal tank pressure to the desired level, the mold 120 may then be filled. The operator manually grasps the knob 164 of the filler port cover 160, and rotates it away from the fill port 130, to the position of FIG. 3. Then he inserts the bulbous nozzle 128 of the delivery hose 122 into shallow engagement with the port 130, so that the filling connection is made.

The fill valve 124 may either be manually operated, or may be electrically operated in response to contact between the nozzle 128 and the wall 170 of the fill port 130. In either event, the latex material 106 rushes through the hose 122 and valve 124 under pressure, emerging from the nozzle 128 and entering the fill port 130 to fill the entire volume of the mold 120 in a way that could not be achieved by open pouring. The vent hole 133 formed in the mold top plate 132 prevents any significant amount of foam material from escaping; but it does allow the egress of all air previously contained in the mold 120, thus avoiding the formation of voids in the foam.

At the time that the fill valve 124 opens, the operative connection 154 causes the high volume air inlet valve 152 to open simultaneously, allowing air under pressure to enter the holding tank 100 through the inlet pipe 150 to replace the latex foam material 106 withdrawn for filling the mold. When the mold is filled to the extent that the check valve 126 encounters back pressure, it closes and terminates the filling process.

After the filling of mold 120 is concluded, the operator manually disconnects the nozzle 128 by withdrawing it vertically from the filler port 130, an operation which can be accomplished quite rapidly. As soon as the nozzle 128 has been removed, the hinged cover 160 is quickly rotated back into the covering relationship with the filler port 130, thus sealing the filler port to prevent escape of the pressurized foam material within the mold.

After the valve 152 permits the entry of sufficient air to replace the latex foam discharged, the pressure sensing valve 142 senses the tank pressure by means of tube 144, and opens as necessary to bring the pressure in the holding tank 100 to the predetermined level. Thus the next filling operation will be conducted at the same initial pressure as the previous one, making the process repeatable and therefore reliable, regardless of the rate of flow of latex foam into the tank 100 via the supply line 102.

Of course if an excess of foam should be supplied to the tank 100 through the line 102, then the foam material 106 rises above level 108 and makes contact with the paddle wheel 110, whereupon the shaft 112 causes the switch 114 to shut off the supply valve 104 by means of the operative connection 116. This terminates the inrush of latex material to the tank 100 until after the level of foam material has subsided below the paddle wheel 110.

It will now be appreciated that the present invention provided a pressurized low density foam molding system which provided a high degree of automation and various inherent safeguards in its operation. It also provides a rapidly connectable and disconnectable nozzle and filler port mechanism, and a rapidly closeable cover which seals off the port immediately after filling of the mold. Finally, the cavity vessel and its top plate are formed in a way to provide superior sealing and self-trimming performance, with near elimination of flash.

Since the foregoing description and drawings are merely illustrative, the scope of protection of the invention has been more broadly stated in the following claims; and these should be liberally interpreted so as to obtain the benefit of all equivalents to which the invention is fairly entitled.

Having thus described our invention, what we claim and desire to protect by Letters Patent is:

1. An inlet and nozzle apparatus for a mold comprising:
a fill port bounded by an internal conically tapered surface;
and a bulbous nozzle of circular cross-section for mating with and disengaging from said conically tapered surface.

2. An inlet and nozzle apparatus for a mold in accordance with claim 1 which includes means pivotally mounted on a mold for rapid covering of said fill port after disengagement of said nozzle therefrom, said covering means being formed with means for mating with said conically tapered surface whereby to close said mold.